United States Patent Office 3,225,268
Patented Dec. 21, 1965

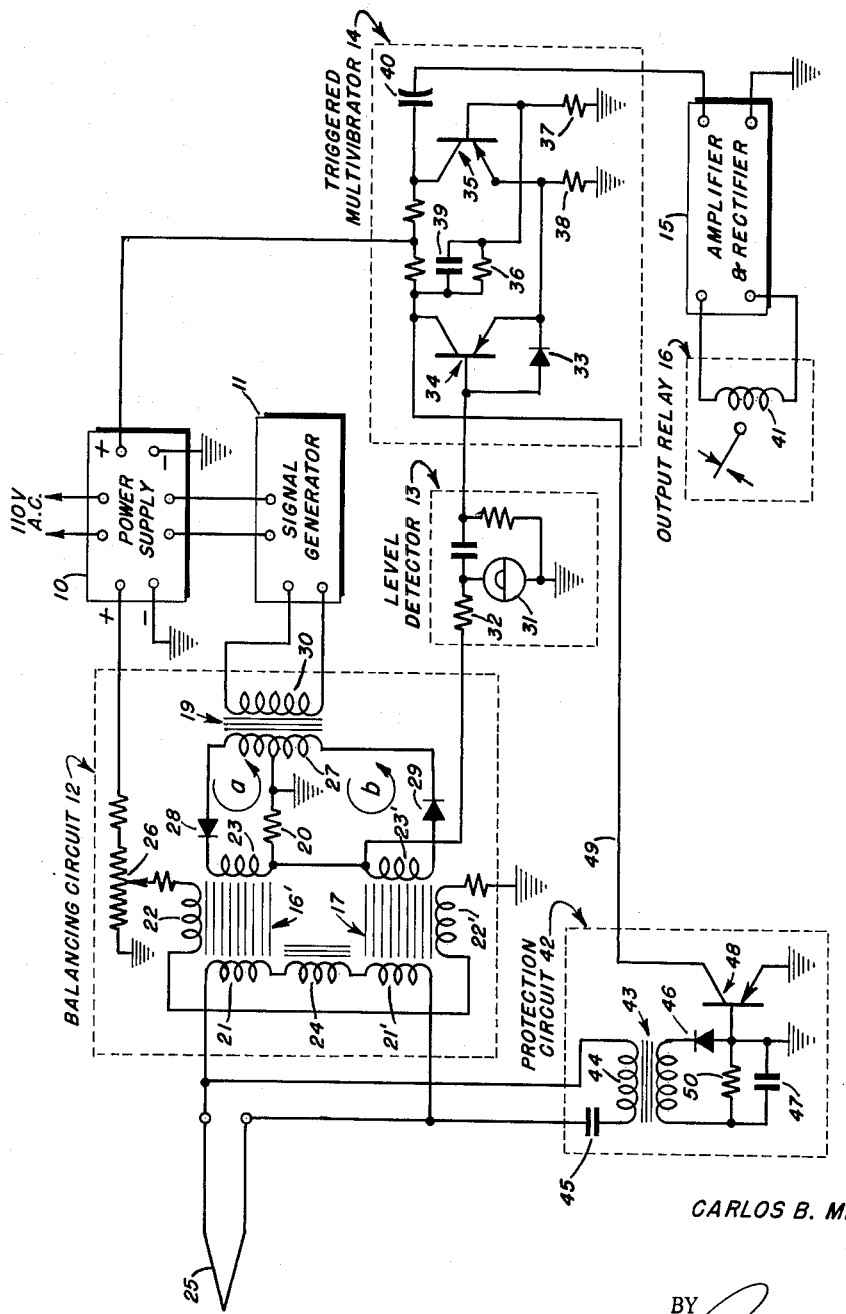
CARLOS B. METZADOUR
INVENTOR.
BY Radolph L. Gwick
ATTORNEY

3,225,268
PROTECTION CIRCUIT FOR CONTROL APPARATUS
Carlos B. Metzadour, Fort Lee, N.J., assignor to Thermo Electric Co., Inc., Saddle Brook, N.J., a corporation of New Jersey
Filed Sept. 11, 1962, Ser. No. 222,843
8 Claims. (Cl. 317—148.5)

This invention relates to control apparatus for use in maintaining a variable condition at a preselected level and more particularly to control apparatus provided with means to prevent runaway operation upon failure of the input sensing element.

Apparatus made in accordance with this invention is adapted for use in any system wherein deviations in a variable condition, from a preselected level, or norm, produce corresponding changes in an electrical signal thereby to effect a condition of system unbalance, and wherein power means are provided for effecting an appropriate corrective action on the condition thereby to return the system to a balanced condition. However, the apparatus will be described hereinbelow with specific reference to a temperature controller.

In temperature controllers, manually settable means are provided for establishing the set point of the apparatus, that is, the temperature level to be maintained in a furnace, or the like. The actual furnace temperature is measured by a thermocouple and deviations of the furnace temperature from the set point level results in an appropriate change in the electrical energy supplied to the furnace. The thermocouple develops a D.C. electrical potential having a magnitude which varies with the temperature difference between the hot and cold junctions thereof. Various means are available for converting the thermocouple potential into a corresponding alternating potential whereby conventional A.C. amplifiers can be used to effect a rebalancing of the control system and to operate power apparatus for the control of energy supplied to the furnace.

My co-pending United States application, Serial No. 210,471, filed July 17, 1962, and entitled, "Control Apparatus, now Patent No. 3,153,748, discloses a controller utilizing a pair of saturable core reactors as the balancing circuit, rather than a conventional potentiometric balancing circuit. The reactor type controller is a completely solid state device, is of small overall size and has a high order of sensitivity and accuracy. The invention to be described hereinbelow is particularly adapted for use in conjunction with a saturable core balancing circuit of this type.

In control apparatus, particularly a temperature controller, it is essential to prevent continuous application of energy to the furnace upon failure of any circuit component. Various so called fail-safe arrangements have been proposed for this purpose. In the case of a thermocouple type controller an electrical discontinuity developing in the thermocouple circuit results in a system unbalance in a direction such that the apparatus calls for more heat to be supplied to the furnace thereby resulting in system runaway.

A principal object of this invention is the provision of protective circuits for a controller having a closed circuit type of temperature-sensing element.

Another object of this invention is the provision of a control system having a thermocouple, or the like, as a temperature-sensing member, which system includes automatic means effecting a fail safe condition upon opening of the circuit to the sensing member.

A still further object of this invention is the provision of an on-off temperature controller utilizing saturable core reactors as the circuit balancing elements and including protective means connected in the thermocouple circuit said protective means being ineffective during normal operation of the controller and becoming effective upon opening of the thermocouple circuit to retain the controller in the off position.

These and other objects and advantages of the invention will become apparent from the following description when taken in connection with the accompanying drawings. It will be understood however that the drawing is for purposes of illustration and it will not to be construed as defining the scope or limits of the invention reference being had for the latter purpose to the claims which are appended hereto.

Reference now is made to the single figure of the drawing wherein the main components of apparatus made in accordance with this invention are shown enclosed within dotted lines. There are several subcombinations namely, a power supply 10, a signal generator 11, a balancing circuit 12, a voltage level detector 13, a triggered, mono-stable multivibrator 14, an output amplifier and rectifier 15 and an output relay 16. The power supply 10 provides regulated D.C. voltages of proper magnitude for energization of the various components of the apparatus.

The balacing circuit 12 comprises the identical, saturable core reactors 16' and 17, a coupling transformer 19 and an output resistor 20. Each reactor carries three coils, specifically, in the aggregate, 21, 21' and 22, 22' and 23, 23'. The coils 21, 21', which are termed the control coils, are connected in a series circuit which include the inductor 24 and the thermocouple 25. The coils 22, 22', termed the biasing coils, are connected in series between ground and the slider of a potentiometer 26 whereby the magnitude of the current flowing through these coils is directly related to the setting of the potentiometer. The coils 23, 23', termed the energizing coils, are connected in series across the center-tapped secondary winding 27, of the coupling transformer 19, through the reversely-disposed rectifiers 28 and 29, with the common junction of the coils connected to the center tap through the output resistor 20.

The reactors can be energized by applying a sinusoidal voltage to the primary winding 30, of the input transformer 19. However, in order to obtain reasonably steep and high level current pulses in the energizing windings 23, 23', the applied voltage should be high enough to effect saturation of the reactor cores in a very short time period, which requires a considerable amount of power. Additionally, energizing the reactors directly from an A.C. power line requires adequate voltage regulation and increases the wire size of the energizing windings. I, therefore, prefer to energize the reactors by a signal generator 11 which is a free-running, multivibrator generating square waves having a frequency of, say, 600 cycles per second, and a predetermined magnitude sufficient to saturate the cores.

By reason of the core-saturation feature, the currents flowing in the energizing windings 23 and 23' have sharply-peaked wavefronts. The balancing circuit appears to be symmetrical, but it will be noted that the diode rectifiers 28 and 29 are connected in the circuit of the energizing coils in such a way that current can flow only in one direction, namely, counterclockwise, as indicated by the arrows "a" and "b." Thus, the current flowing through the output resistor 20 is the difference between the two loop currents. If the wavefronts of the currents flowing in the two loops coincide precisely in time, the voltage across the output resistor will be zero. On the other hand, if these wavefronts are displaced, time-wise, relative to each other, a sharply-peaked voltage of one or another polarity will appear across the output resistor.

The current flowing in the biasing windings 22, 22' changes the saturation level of the cores and, therefore, controls the position of the sharp wavefronts of the current pulses flowing in the energizing windings 23, 23'. With the biasing windings wound on their respective cores in the same sense, and with the energizing windings wound in reverse-sense relative to each other, the D.-C. biasing current shifts the wavefronts of the energizing current pulses in opposite directions and controls the width, height and polarity of the resulting voltage pulses appearing across the output resistor 20. The height of such voltage pulses will vary because of the wavefronts of the currents flowing in the reactor energizing windings are steep but not absolutely vertical. A balanced condition of the balancing circuit 12 prevails only when the wavefronts of the energizing currents coincide precisely. Thus, for a small change in the D.-C. biasing current, thin, steep voltage pulses appear across the output resistor 20, the polarity of such voltage pulses corresponding to the sense of the change of the biasing current relative to the setting of the potentiometer 26, which potentiometer is connected to a constant D.-C. voltage produced by the power supply 10.

Actually, the D.-C. ampere-turns effective to shift the saturation points of the reactor cores are composed of two components, namely, the ampere-turns due to the biasing current flowing in the biasing coils 22, 22' (the magnitude of which is determined by the setting of the potentiometer 26) and the ampere-turns due to the reverse current flowing in the control windings 21, 21' (the magnitude of which is determined by the voltage generated by the thermocouple 25). When the D.C. current flowing through the biasing windings is relatively large, a relatively large D.C. current flow is required in the control windings to establish ampere-turn equality so that the wavefronts of the currents flowing in loops "a" and "b" coincide exactly in point of time to thereby result in a zero voltage level across the output resistor. Conversely, the lower the magnitude of the biasing current, the lower must the control winding current become to achieve the same result. It will be apparent, therefore, that the set point of the controller corresponds to the setting of the potentiometer 26 and that the potentiometer movable arm can be mechanically coupled to an indicator which cooperates with a scale suitably calibrated directly in temperature values. It will further be apparent that the magnitudes of the currents flowing in the biasing and control windings need not be equal to produce a balanced condition of the balancing circuit as the windings may have different numbers of turns.

The inductor 24, which is operated at all times well below saturation, permits the flow of D.C. current through the control windings 21, 21' and, at the same time, isolates the reactors so that they are not linked during that part of the operating cycle in which the cores are not saturated.

The voltage pulses appearing across the output resistor 20, upon unbalanced conditions of the balancing circuit, are utilized to control the actuation of a control member such as, for example, the power relay 16, for the on-off control of electrical energy supplied to a furnace, the actual temperature of which is sensed by the thermocouple. In operation, when the temperature at the thermocouple corresponds to the set-point level, as established by the setting of the potentiometer 26, the voltage across the output resistor 20 is zero and the relay 16 is deenergized. When the thermocouple temperature exceeds the set-point level, the voltage pulse developed across the output resistor are of a polarity such that they do not effect energization of the power relay. However, when the thermocouple temperature is below the set-point level, voltage pulses of reverse polarity appear across the output resistor and such pulses result in the energization of the power relay. In such case, the contacts of the power relay are arranged to close the circuit between a source of voltage and the heating element of the furnace.

It is desirable to establish a fixed, finite point of reference while will determine the on or off condition of the controller. Such reference point (which corresponds to a balanced condition of a conventional bridge type controller or to a zero error voltage in a potentiometric type controller) could be the instant when the two saturable core reactors produce equal current flow in their respective loops "a" and "b." However, due to the lack of absolute equality between the two reactors and the effects of transients in the switching process, it is desirable to establish a reference level at a voltage level other than zero across the output resistor 20. This is accomplished by means of the level detector 13, consisting of the tunnel diode 31 connected across the output resistor through a load resistor 32. As explained in detail in my co-pending application Serial No. 210,471 when an input voltage is applied to the tunnel diode the output voltage pulse increases proportionally until the diode peak point is reached, after which a negative resistance effect occurs causing the output voltage pulse to jump suddenly to a much higher magnitude. The circuit constants are selected so that the jump in the diode output voltage is of the order of 500 millivolts, which voltage is utilized to trigger the mono-stable multivibrator 14.

The multivibrator, which is a modified Schmidt trigger circuit, generates a signal having a relatively high energy content each time a voltage pulse is delivered thereto by the tunnel diode. The diode 33 is forwardly biased so that a voltage drop of about 300 millivolts appears across the base-emitter of the transistor 34, which retains the transistor in the non-conducting, or off, condition. At the same time, the transistor 35 is in the conducting, or on, condition, due to the bias established by the voltage divider comprising the resistors 36 and 37. Thus, the incoming, negative voltage pulse from the tunnel diode must overcome the 300 millivolt threshold voltage in order to drive the transistor 34 into conduction. Conduction of transistor 34 produces an amplified signal which cuts off the transistor 35. This lowers the voltage drop across the emitter resistor 38 which helps the transistor 34 to continue conducting. This state continues until the coupling capacitor 39 is discharged to the point where the transistor 35 again conducts. At such time, the potential across the emitter resistor 38 increases, thereby cutting off the transistor 34 until another voltage pulse starts the cycle again. Inasmuch as the triggering point of the multivibrator may change slightly, due to temperature drift in the transistors, the use of the tunnel diode has the advantage that the relatively high jump in its output voltage eliminates the effect of any possible variation in the multivibrator triggering point. It is only necessary that the triggering point fall somewhere between, say, 50 and 500 millivolts. In this way, proper and positive operation of the power relay is assured.

The square wave signal from the multivibrator is rectified and amplified by means of conventional circuitry, such signal being coupled to the amplifier-rectifier 15 through an electrolytic capacitor 40. When the multivibrator is triggered, the amplifier-rectifier 15 energizes the operating coil 41 of the power relay, thereby delivering power to the furnace. In the absence of a signal supplied to the amplifier, due either to a balanced condition of the balancing circuit 12 or to the failure of a circuit component, the relay 16 is deenergized and power to the furnace is cut off. Since a negative voltage pulse exceeding 300 millivolts must be supplied by the tunnel diode in order to trigger the multivibrator, it will be clear that the circuit is so arranged that negative voltage pulses appear only when the thermocouple temperature is below the set-point of the controller, as determined by the setting of the potentiometer 26.

To set the controller for operation at a given temperature, the potentiometer 26 is set to a position corresponding to the desired temperature thereby causing a D.C. current of known magnitude to flow through the reactor biasing windings 22, 22'. Such biasing current flow shifts the leading edges of the current pulses flowing in the energizing windings 23, 23', relative to each other, thereby resulting in voltage pulses appearing across the output resistor 20. Such voltage pulses trigger the multivibrator causing energization of the power relay and the application of energy to the furnace. The product of the ampere turns of the biasing winding must be counteracted by equal ampere turns of the control windings 21, 21', which windings are connected in series with the thermocouple, in order to bring the wavefronts of the energizing currents into exact coincidence and thereby result in a zero voltage across the output resistor. If, then, during operation of the controller, the thermocouple circuit should be opened, as by burn-out of the thermocouple, energy will be supplied to the furnace continuously.

To prevent such runaway action of the controller, I provide a protection circuit 42 comprising a transformer 43 having a primary winding 44 connected across the thermocouple leads, at the controller, through a capacitor 45. The thermocouple 25 has a low impedance, a few ohms at most, and constitutes a short circuit for the signal that normally would appear across the primary transformer primary winding 44. However, when the thermocouple circuit is opened, the voltage developed across the reactor control windings 21, 21' appears across transformer primary winding 44. Such voltage comprises pulses of rather high voltage but low current. The transformer 43, which isolates the thermocouple from ground, develops voltage pulses in the secondary winding which pulses are rectified by the diode 46 and applied across the capacitor 47. A negative voltage appearing across the capacitor 47 is applied to the base of a transistor 48 (which transistor normally is non-conducting) thereby causing the transistor to conduct. Conduction of the transistor 48 effectively grounds the collector of the multivibrator transistor 34, through the lead 49, thereby preventing operation of the multivibrator which, of course, deenergizes the power relay 16.

When the thermocouple circuit is restored to normal closed condition, the voltage across the capacitor 47 disappears, being dissipated through the shunting resistor 50, and the base circuit of the transistor 48, and the transistor again becomes non-conducting. The capacitor 45 is used to permit the application of voltage pulses to the transformer primary winding 44 without adding resistance in parallel with the reactor control windings. Such parallel resistance, in the D.C. current path, would reduce the sensitivity of the system or would call for a transformer 43 of very high impedance.

Having now described the invention in detail, those skilled in this art will be able to make various changes and modifications to adapt the apparatus for use in specific applications. It is intended that changes and modifications of this character can be made without departing from the scope and spirit of the invention as recited in the following claims.

I claim:

1. A protection circuit for control apparatus of the class comprising a sensing member responsive to changes in a condition, circuit elements normally forming a closed electrical circuit between the sensing member and a balancing circuit settable to a predetermined set-point level at which the condition is to be maintained, means providing a signal when the condition departs from the set-point level, and control means actuated by said signal to effect a change in the state of the condition; said protection circuit comprising means connected to the sensing member and developing a second signal only when the electrical circuit between the sensing member and the balancing circuit is open, and means responsive to the second signal and effective to prevent actuation of the control means by the said first said signal.

2. A protection circuit for a temperature controller of the class having a temperature-sensing thermocouple and a control member actuated from an off to an on position when the thermocouple temperature is below the temperature set-point of the controller, said protection circuit comprising means connected in the thermocouple circuit and generating a voltage signal only when the thermocouple circuit is open, and means responsive to the voltage signal and preventing actuation of the control member.

3. Control apparatus for maintaining a variable condition at a predetermined state comprising,
   (a) sensing means of the closed electrical circuit type for producing a D.C. signal which varies in correspondence with the actual state of the condition,
   (b) means for establishing a predetermined reference state at which the condition is to be maintained,
   (c) means including said first signal for producing a second signal when the actual state of the condition deviates from the reference state,
   (d) control means actuated by the second signal to effect a change in the condition,
   (e) means developing a third signal only when the electrical circuit of the sensing means is open, and
   (f) circuit elements applying the third signal to the control means in a sense to prevent actuation thereof by the second signal.

4. Control apparatus for maintaining a variable condition at a predetermined level comprising,
   (a) a balancing circuit,
   (b) means to unbalance the balancing circuit to an extent corresponding to a predetermined reference level of the condition,
   (c) a normally-closed circuit sensing member connected to the balancing circuit and producing a D.C. signal which varies in correspondence with the actual level of the condition,
   (d) means producing a control signal from the balancing circuit when the actual level of the condition is below the reference level,
   (e) a control member actuated by the control signal from a normally-off to the on position,
   (f) means connected across the sensing member and developing a second signal only when the circuit of the sensing member is open, and
   (g) circuit elements applying the second signal to the control member in a sense to prevent actuation of the control member by the control signal.

5. Control apparatus comprising,
   (a) a pair of saturable core reactors carrying series-connected sets of energizing, biasing and control windings,
   (b) means producing a flow of current pulses in the set of energizing windings, the magnitude of such current pulses being at least sufficient to produce core saturation,
   (c) means producing a flow of D.C. current of predetermined magnitude in the set of biasing windings, the direction of current flow in the individual biasing windings being such as to produce a time displacement of the leading edges of the current pulses flowing in the individual energizing windings,
   (d) a sensing member connected to the set of control windings and producing a D.C. voltage which varies in magnitude with the state of a condition to be controlled by the apparatus,
   (e) means producing output voltage pulses when the leading edges of the energizing winding current pulses are time-displaced relative to each other,
   (f) an output member actuatable from an off to an on position,
   (g) control means responsive to said output voltage pulses and actuating the output member,
   (h) a transformer having a primary winding and a secondary winding,
   (i) circuit elements including a capacitor connecting the transformer primary winding across the sensing member, and (j) circuit elements connecting the transformer secondary winding to the said control means such that the voltage generated in the secondary winding prevents the control means from responding to the said output voltage pulses.

6. Temperature control apparatus comprising, (a) a pair of saturable core reactors having series-connected energizing windings, biasing windings and control windings, (b) a first transformer having a primary winding and a center-tapped secondary winding, (c) an output resistor connected between the center tap of said secondary winding and the common junction of said energizing windings, (d) circuit elements including a pair of rectifiers connecting an end each energizing winding to an end of the center-tapped secondary winding, (e) a source of energizing voltage connected across the primary winding of the first transformer, (f) a source of D.-C. voltage, (g) means applying a predetermined magnitude of the said D.-C. voltage across the reactor biasing windings, (h) a temperature sensing thermocouple connected across the reactor control windings, (i) a control member actuable from an off to an on position, (j) a mono-stable multivibrator having a predetermined triggering voltage, (k) circuit elements applying to the voltage developed across said output resistor to the multivibrator thereby to trigger the multivibrator when the magnitude of such voltage exceeds the said predetermined triggering voltage, (l) circuit elements connecting the said control member to the multivibrator to effect actuation thereof when the multivibrator is triggered, (m) a second transformer having a primary winding connected across the thermocouple through a capacitor and a secondary, winding, (n) a rectifier and a second capacitor connected in series across the secondary winding of the second transformer, and (o) circuit applying the voltage appearing across the second capacitor to the multivibrator to prevent triggering thereof.

7. The invention as recited in claim 6, wherein the circuit elements applying the voltage appearing across the second capacitor to the multivibrator comprises a transistor having input electrodes connected across the second capacitor and output electrodes connected to the multivibrator in a manner to prevent triggering of the multivibrator when the said transistor is in the conducting state.

8. A temperature controller comprising, (a) a pair of saturable core reactors having series-connected energizing windings, biasing windings and control windings, (b) a first transformer having a primary winding and a center-tapped secondary winding, (c) an output resistor connected between the center tap of said secondary winding and the common junction of said energizing windings, (d) circuit elements including a pair of rectifiers connecting an end of each energizing winding to an end of the center-taped secondary winding, (e) means applying unidirectional voltage pulses to the primary winding of said first transformer, (f) means applying a D.-C. voltage of predetermined magnitude across the reactor biasing windings, (g) a temperature-sensing thermocouple connected across the reactor control windings, (h) a control member actuatable from an off to an on position, (i) a mono-stable multivibrator comprising two transistors one of which is biased in non-conducting state by a predetermined biasing voltage, (j) a tunnel diode connected across the said output resistor through a load resistor, the total effective resistance loading of the diode being higher than the negative resistance of the diode thereby resulting in a sharply increased diode output voltage when the current flow through the diode exceeds the diode peak point, (k) circuit elements connecting the tunnel diode across the input electrodes of the non-conducting multivibrator transistor such that the diode output voltage triggers the multivibrator, (l) circuit elements connecting said control member to the multivibrator to effect actuation thereof when the multivibrator is triggered, (m) a second transformer having a primary winding connected across the thermocouple through a first capacitor and a secondary, winding, (n) a second capacitor connected across the secondary winding of the second transformer through a rectifier, (o) a resistor connected across the second capacitor, and (p) a third transistor having input electrodes connected across the second capacitor and input electrodes connected to the input electrodes of the non-conducting multivibrator transistor.

References Cited by the Examiner

UNITED STATES PATENTS

| 2,452,023 | 10/1948 | Wild | 318—28 |
| 2,520,485 | 8/1950 | Wild | 318—28 |
| 2,898,436 | 8/1959 | Lawler | 219—20 |

SAMUEL BERNSTEIN, *Primary Examiner.*